United States Patent
Zimmermann

[11] Patent Number: 5,961,097
[45] Date of Patent: Oct. 5, 1999

[54] ELECTROMAGNETICALLY ACTUATED VALVE WITH THERMAL COMPENSATION

[75] Inventor: Daniel E. Zimmermann, Peoria, Ill.

[73] Assignee: Caterpillar Inc., Peoria, Ill.

[21] Appl. No.: 08/768,151

[22] Filed: Dec. 17, 1996

[51] Int. Cl.⁶ .................. F16K 31/02; F16L 9/04
[52] U.S. Cl. .................. 251/129.19; 251/129.1; 123/90.11; 335/270; 335/273
[58] Field of Search .......... 251/129.2, 129.19, 251/129.18, 129.16, 64, 129.1; 123/90.11; 335/256, 257, 258, 266, 268, 271, 273

[56] References Cited

U.S. PATENT DOCUMENTS

| | | | |
|---|---|---|---|
| 3,970,282 | 7/1976 | Hansen | 251/129.19 X |
| 4,008,876 | 2/1977 | Bastle | 251/129.19 |
| 4,455,543 | 6/1984 | Pischinger et al. | 335/266 |
| 4,763,091 | 8/1988 | Lang | 335/258 |
| 4,844,339 | 7/1989 | Sayer et al. | 251/129.19 X |
| 5,131,624 | 7/1992 | Kreuter et al. | 251/129.18 |
| 5,139,227 | 8/1992 | Sumida et al. | 251/129.19 X |
| 5,370,355 | 12/1994 | Rembold et al. | 251/129.19 X |
| 5,548,263 | 8/1996 | Bulgatz et al. | 335/274 |
| 5,645,019 | 7/1997 | Liang et al. | 123/90.11 |

FOREIGN PATENT DOCUMENTS

| | | |
|---|---|---|
| 43426A1 | 4/1981 | Germany . |
| WO95/0959 | 1/1995 | WIPO . |

*Primary Examiner*—John Rivell
*Attorney, Agent, or Firm*—Larry G. Cain; Mario J. Donato

[57] ABSTRACT

An electromagnetic actuator for an electromagnetically actuated valve is disclosed. The actuator includes an electromagnet and an armature, the armature having a normally biased initial spaced apart first position distal from the electromagnet when the electromagnet is off and a second fixed stop position in abutment with the electromagnet when the electromagnet is on. In addition, the actuator includes a resilient member adapted to bias the armature in the normally biased initial spaced apart first position, and a compliant member operably connected to the armature. The armature approaches the electromagnet when the electromagnet is on and compresses the compliant member until the armature reaches the fixed stop position.

14 Claims, 2 Drawing Sheets

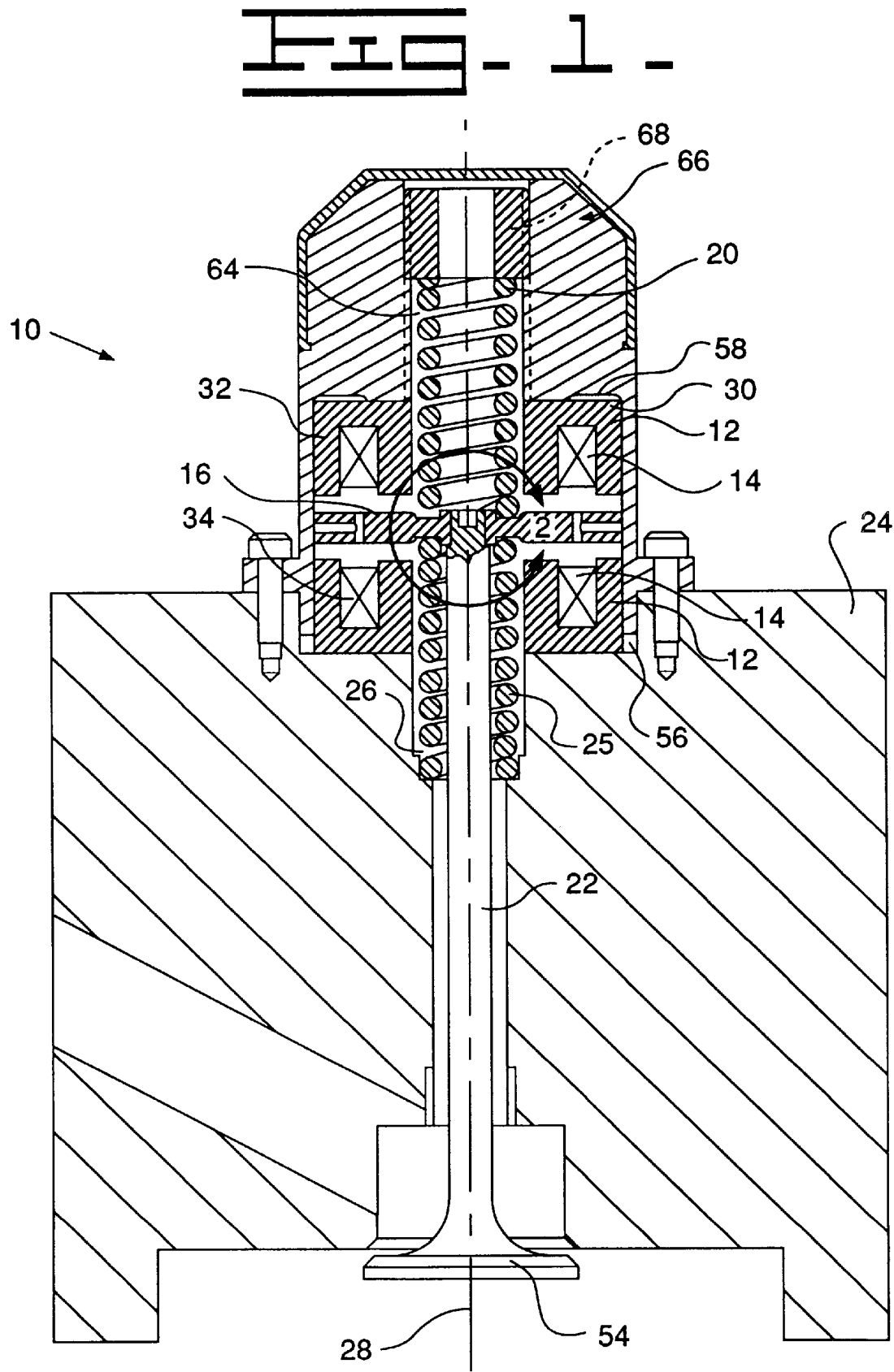
Fig_1_

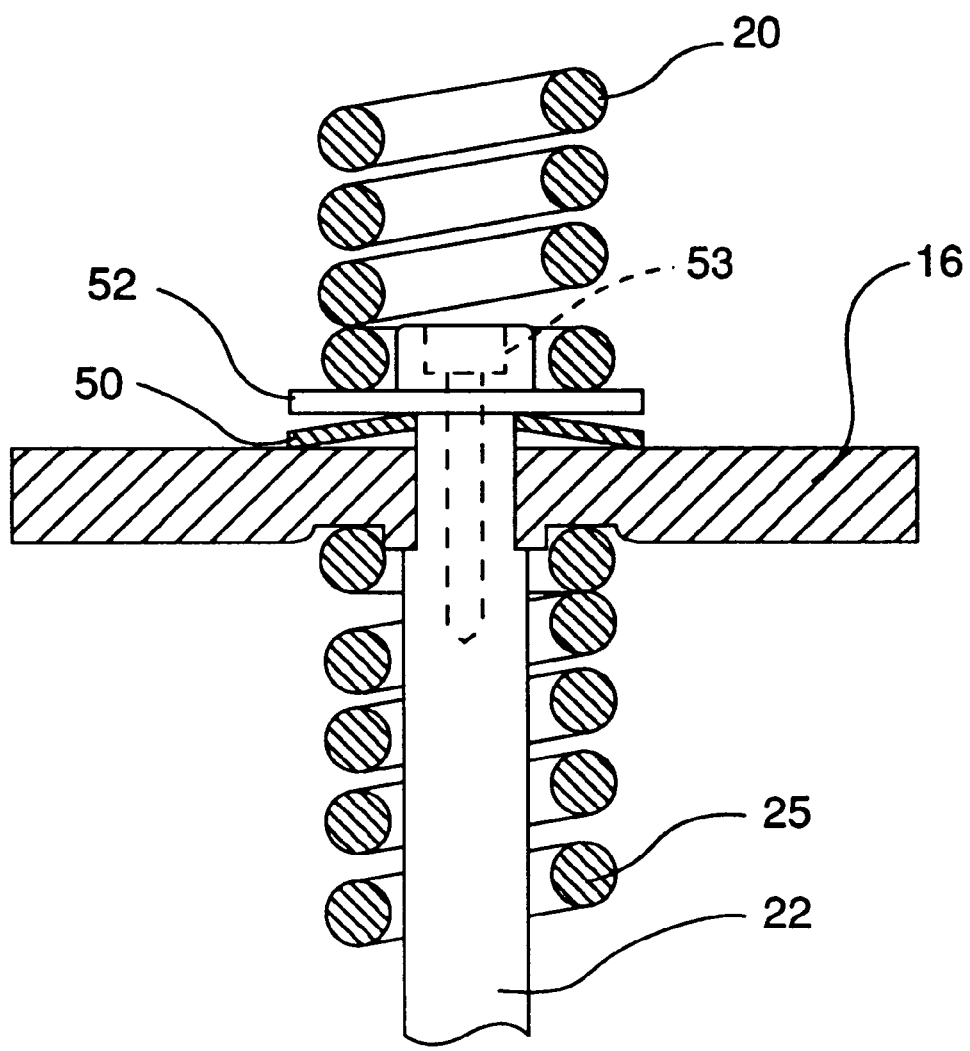

5,961,097

ELECTROMAGNETICALLY ACTUATED VALVE WITH THERMAL COMPENSATION

TECHNICAL FIELD

The present invention relates generally to an electromagnetically actuated valve, and more particularly, to an electromagnetically actuated valve that provides compensation for thermal expansion of the valve stem, thereby allowing the valve to fully seat when closed.

BACKGROUND ART

In the past, electromagnetically actuated valves have been designed for opening and closing mechanisms that combine the action of springs with electromagnets. For example, in U.S. Pat. No. 4,614,170 issued to Pischinger, it is disclosed to use springs in an electromagnetically actuated valve to switch from an open position to a closed position and vice-versa. In these valves, the core lies at a center equilibrium position between two electromagnets. To close the valve, a first electromagnet is energized, attracting the core to the first electromagnet and compressing a spring. To open the valve, the energized first electromagnet is turned off and the second electromagnet is energized. Due to the force of the pre-stressed spring, the core is accelerated toward the second electromagnet, thereby reducing the amount of magnetic force required to attract the core away from the first electromagnet.

One problem with the earlier valve designs was that the moving core did not operate quickly enough to open and close the valves with sufficient speed, force, or stroke required for the opening and closing of an internal combustion engine's intake and exhaust valves, or for the force and stroke required for gas compressors. Therefore, a need existed for a valve design that provided an efficiently designed moving core assembly that could be accelerated quickly enough for the desired applications, such as the modern internal combustion engine.

Another problem encountered with the design of electromagnetically actuated valves is in obtaining the precise mechanical tolerances required to achieve a zero gap at the upper electromagnet when the valve is properly seated. This problem is exacerbated by the thermal expansion that occurs during operation of the valve, in that the valve stem of an electromagnetic actuator typically lengthens due to heat expansion. When the valve closes, the pole face of the moving core element contacts the upper electromagnet, but due to the increased length in the valve stem, the valve may not be seated properly. Alternatively, the valve may be seated before the armature element reaches the upper electromagnet, preventing the valve from obtaining a zero gap. A zero gap is desired to maintain power consumption at a low level, and therefore, the valve is not operating at a desired efficiency level.

Another problem with the previously designed valves is that the moving core assembly must return to an initial neutral position when not in operation. The initial neutral position of the core element must be equidistant from both the first electromagnet and the second electromagnet. As previously described, it is known to use a spring to bias the core assembly in this neutral position. However, spring tensions inevitably vary, which creates difficulty in obtaining a neutral position for the core element that is centered between the electromagnets.

The present invention is directed to overcoming one or more of the problems set forth above.

DISCLOSURE OF THE INVENTION

An electromagnetic actuator for an electromagnetically actuated valve is disclosed. The actuator includes an electromagnet and an armature, the armature having a normally biased initial spaced apart first position distal from the electromagnet when the electromagnet is off and a second fixed stop position in abutment with the electromagnet when the electromagnet is on. In addition, the actuator includes a resilient member adapted to bias the armature in the normally biased initial spaced apart first position, and a compliant member connected to the armature. The armature approaches the electromagnet when the electromagnet is on and compresses the compliant member until the armature reaches the fixed stop position.

BRIEF DESCRIPTION OF THE DRAWINGS

For a better understanding of the present invention, reference may be made to the accompanying drawings in which:

FIG. 1 is a diagrammatic cross-sectional view of a preferred embodiment of an electromagnetically actuated valve of the present invention;

FIG. 2 is an enlarged diagrammatic cross-sectional view of circle 2 of FIG. 1.

DESCRIPTION OF A PREFERRED EMBODIMENT OF THE INVENTION

Referring now to the drawings, a preferred embodiment of an electromagnetically actuated valve 10 of the present invention is shown. In the embodiment shown, the valve 10 includes two pairs of electromagnetic elements 12, a plurality of coils 14, a core or armature element 16, an upper support spring 20 and a lower support spring 25, a valve stem 22, and a cylinder head 24. Each of the electromagnetic elements 12 are preferably annular in shape, and define a central chamber 26. The central chamber 26 further defines a central vertical axis 28.

FIG. 1 shows a diagrammatic cross-sectional view of a preferred embodiment of an electromagnetically actuated valve of the present invention, wherein each pair of electromagnetic elements 12 further comprises an upper electromagnetic element 32 and a lower electromagnetic element 34. The upper and lower electromagnetic elements 32 and 34 are in a mirrored relationship to each other, with the central channels 30 of the upper and lower electromagnetic elements being in a facing relationship to each other.

Disposed intermediate the upper and lower electromagnetic elements 32 and 34 is the armature element 16. The armature element 16 is preferably annular in shape in horizontal cross-section. The armature element 16 provides two pole faces (not shown).

The armature element 16 is connected to the valve stem 22. The valve stem 22 preferably extends in axial alignment with the central vertical axis 28 of the central chamber 26 of the electromagnetic elements. Cylinder head 24 encloses the valve.

The support springs 20 and 25 are also disposed within the central chamber 26, preferably surrounding the valve stem 22. In the preferred embodiment shown in FIG. 1, the lower end of support spring 25 contacts the cylinder head 24.

Referring to FIG. 2, the electromagnetically actuated valve includes a compliant member 50. In the embodiment shown, the compliant member 50 is operably connected to the valve stem 22 and, in the preferred embodiment, is in the form of a spring washer or a Belleville washer. A flat washer 52 is operably connected to the valve stem above the spring washer 50. A securing member 53 is provided, which secures the compliant member 50 to the valve stem 22. In the preferred embodiment, securing member 53 is a cap screw disposed through the aperture of the spring washer 50 and through the aperture of the flat washer 52, and is screwed into the valve stem 22 and secured in place. Although a preferred embodiment is described as including a cap screw 53, it will be appreciated by those skilled in the art that other suitable securing means can be readily and easily used without deviating from the spirit and scope of the present invention. For example, one skilled in the art would recognize that a bolt, rivet, or other suitable securing member, could be substituted for the cap screw.

The compliant member 50 is used to compensate for heat expansion in the valve stem 22. More specifically, when the valve head 54 is properly seated, the armature element 16 should be in contact with the upper electromagnet 32. If the valve stem 22 thermally expands, the armature element 16 will contact the upper electromagnet 32 before the valve head 54 is properly seated. However, if the valve stem 22 is shortened to accommodate for thermal expansion, the valve head 54 may seat before the armature element 16 contacts the upper electromagnet 32.

In order to solve this problem, the support spring 20 is used to bias the armature element 16 in the normally biased first position. The support spring 20 is a resilient member, and has a known value of resiliency. Therefore, when the upper electromagnet 32 is on, the armature element 16 moves upward toward the upper electromagnet 32 until the valve head 54 is seated. At this point, the armature element 16 is simply drawn up on the valve stem 22 and compresses compliant member 50 until armature element 16 is in abutment with upper electromagnet 32. In the preferred embodiment, upper and lower electromagnets 32 and 34 are fixed in place and armature element 16 travels on the end of the valve stem 22 between the upper and lower electromagnets 32 and 34. In addition, compliant member 50 provides controlled deceleration of the valve when the valve opens. For example, when the armature element 16 is attracted to lower electromagnet 34 to open the valve, the inertia of the valve head 54 and the valve stem 22 will continue to drive the valve down and it will slightly compress compliant member 50 and decelerate the valve over a fixed distance instead of presenting a shock load to the valve.

Another feature of the present invention is the support spring adjustment member 66. The support spring adjustment member 66 shown in FIG. 1 comprises a hollow screw member 68. The hollow screw member 68 is threadingly engaged into the bolt cavity 64. In the embodiment shown in FIG. 1, the hollow screw member 68 engages the upper end of the support spring 20. The support spring 20 engages the armature element 16. Therefore, when the screw member 68 is tightened, the support spring 20 compresses, moving the armature element 16 in a downward axial position. When the screw member 68 is loosened, the support spring 20 expands, allowing the armature element 16 to move in an upward axial position. The support spring adjustment member 66 may also include a second nut 72 for securing the screw 68 into position.

The function of the support spring adjustment member 66 is to provide precise positioning of the armature element 16 between the upper electromagnet 32 and the lower electromagnet 34. As described above, the armature element 16 should be centered between the upper electromagnet 32 and the lower electromagnet 34. The support spring adjustment member 66 allows the manual positioning of the armature element 16 after the valve is assembled. It should be noted that the support spring adjustment member 66 may contact the support spring 20 in another area and still provide the same positioning feature.

Thus, while the present invention has been particularly shown and described with reference to the preferred embodiment above, it will be understood by those skilled in the art that various additional embodiments may be contemplated without departing from the spirit and scope of the present invention.

I claim:

1. An electromagnetic actuator for an electromagnetically actuated valve, comprising:

an electromagnet;

an armature having a normally biased initial spaced apart first position distal from said electromagnet when said electromagnet is off and a second fixed stop position in abutment with said electromagnet when said electromagnet is on;

a resilient member adapted to bias said armature in said normally biased initial spaced apart first position; and a compliant member adapted to bias said armature away from said electromagnet, said armature approaching said electromagnet when said electromagnet is on and compressing said compliant member until said armature reaches said fixed stop position.

2. An electromagnetic actuator as recited in claim 1, wherein said electromagnet is fixed.

3. An electromagnetic actuator as recited in claim 1, further comprising a first electromagnet and a second electromagnet, said armature being disposed and moveable between said first electromagnet and said second electromagnet.

4. An electromagnetic actuator as recited in claim 1, further comprising an adjustment member, said adjustment member connected to said resilient member, said adjustment member adapted to permit manual positioning of said armature.

5. An electromagnetic actuator as recited in claim 1, wherein said compliant member is a spring washer.

6. An electromagnetic actuator as recited in claim 1, further comprising a securing member, said securing member securing said compliant member to said valve stem.

7. An electromagnetic actuator as recited in claim 6, wherein said securing member is a cap screw.

8. A temperature compensating electromagnetic actuator for an electromagnetically actuated valve, the valve having a valve stem exhibiting thermal expansion, comprising:

an electromagnet;

an armature adapted to be mounted to the valve stem, said armature having a normally biased initial spaced apart first position distal from said electromagnet when said electromagnet is off and an indeterminate second position proximal from said electromagnet when said electromagnet is on, said indeterminate second position varying in relation to the thermal expansion of the valve stem and corresponding to the valve being in a closed position;

a resilient member adapted to bias said armature in said normally biased initial spaced apart first position; and a compliant member operably connected to the valve stem, said compliant member adapted to bias said armature away from said electromagnet, said armature approaching said electromagnet when said electromagnet is on until said armature reaches said second position, said armature subsequently moving on the valve stem toward said electromagnet and compressing said compliant member until said armature is in abutment with said electromagnet.

9. A temperature compensating electromagnetically actuated valve as recited in claim 8, wherein said electromagnet is fixed.

10. A temperature compensating electromagnetically actuated valve as recited in claim 8, further comprising a first electromagnet and a second electromagnet, said armature being disposed and moveable between said first electromagnet and said second electromagnet.

11. A temperature compensating electromagnetically actuated valve as recited in claim 8, further comprising an adjustment member, said adjustment member connected to said resilient member, said adjustment member permitting manual positioning of said armature.

12. A temperature compensating electromagnetically actuated valve as recited in claim 8, wherein said compliant member is a spring washer.

13. A temperature compensating electromagnetically actuated valve as recited in claim 8, further comprising a securing member, said securing member securing said compliant member to said valve stem.

14. A temperature compensating electromagnetically actuated valve as recited in claim 13, wherein said securing member is a cap screw.

* * * * *